(No Model.) 3 Sheets—Sheet 1.
W. G. RICH.
VELOCIPEDE.
No. 350,994. Patented Oct. 19, 1886.
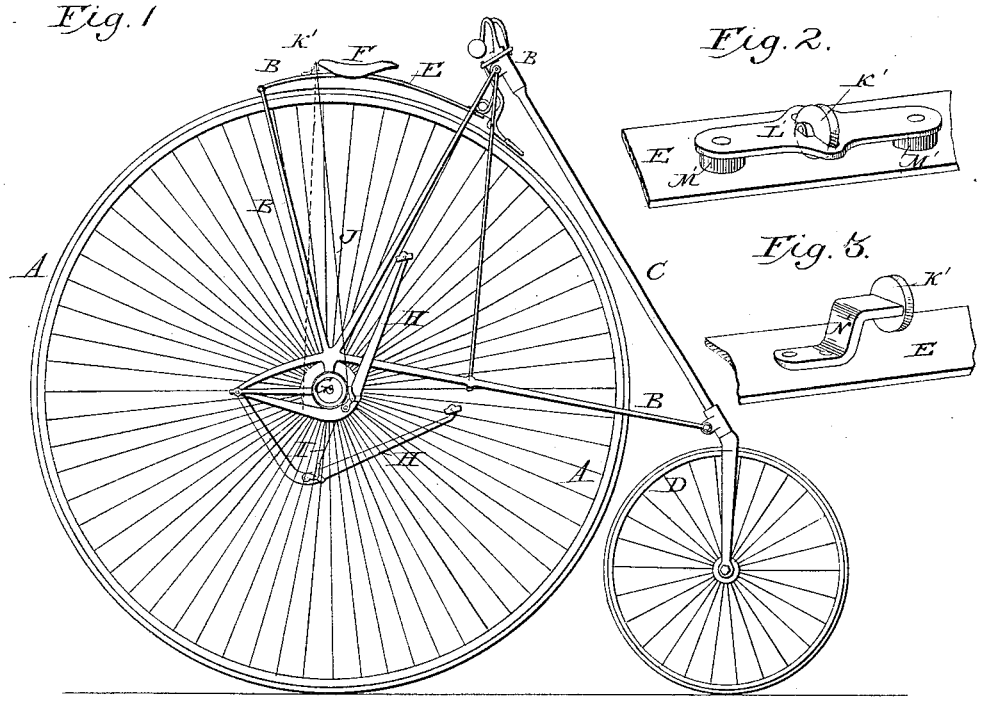
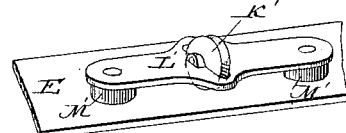
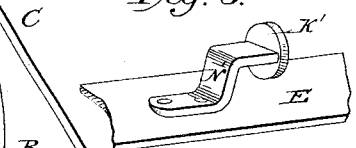
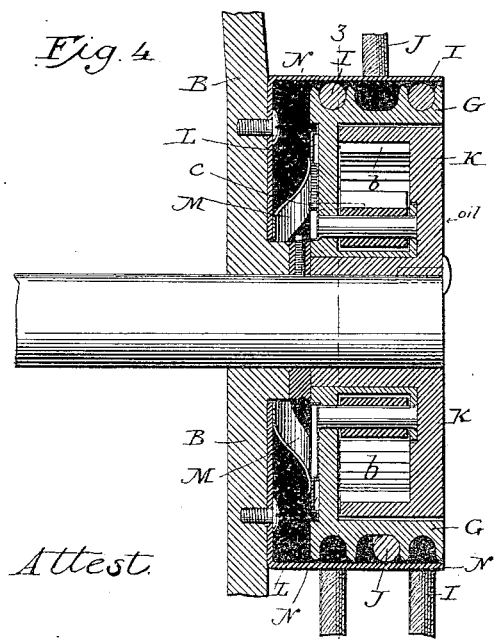
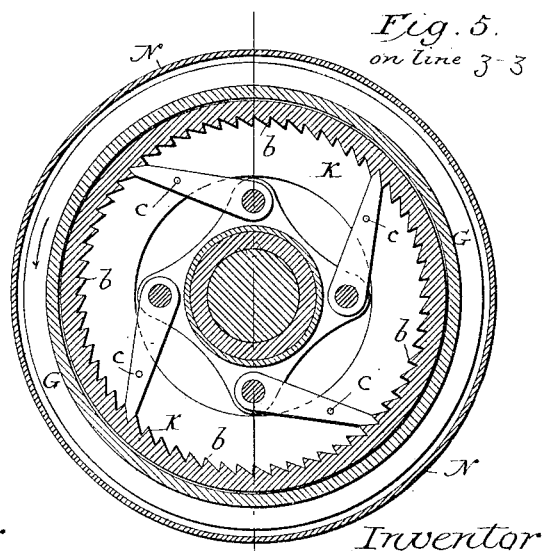
Attest.
Inventor
W. G. Rich
By his Atty
P. T. Dodge (No Model.) 3 Sheets—Sheet 2.

W. G. RICH.
VELOCIPEDE.

No. 350,994. Patented Oct. 19, 1886.

Attest.
Sidney P. Hollingsworth
Wm R Kennedy

Inventor.
W. G. Rich
By his Atty
P. T. Dodge (No Model.) 3 Sheets—Sheet 3.

W. G. RICH.
VELOCIPEDE.

No. 350,994. Patented Oct. 19, 1886.

on line x—x on y—y

Attest.
Sidney P. Hollingsworth
W. R. Kennedy

Inventor.
W. G. Rich
By his Atty
P. T. Dodge.

UNITED STATES PATENT OFFICE.

WILLARD G. RICH, OF ROCHESTER, NEW YORK, ASSIGNOR TO THE H. B. SMITH MACHINE COMPANY, OF SMITHVILLE, NEW JERSEY.

VELOCIPEDE.

SPECIFICATION forming part of Letters Patent No. 350,994, dated October 19, 1886.

Application filed February 9, 1886. Serial No. 191,347. (No model.)

*To all whom it may concern:*

Be it known that I, WILLARD G. RICH, of Rochester, in the county of Monroe and State of New York, have invented certain Improvements in Bicycles, Tricycles, &c., of which the following is a specification.

This invention relates to that class of bicycles, tricycles, &c., in which motion is communicated to the driving wheel or wheels through a clutch mechanism connected with rotating drums, which are in turn connected by straps to foot-levers or treadles.

The invention relates more particularly to improvements in the arrangement represented in my application for Letters Patent of the United States, filed on the 17th day of October, 1885, No. 180,129.

In order to dispense with the springs ordinarily employed for revolving the drums in a backward direction, and to admit of the weight of the rider being carried on the pedals, I connect the two drums by a strap or band passing over an intermediate pulley, as in my previous application; but instead of giving the pulley a rigid support, as in the previous case, I now mount it upon a spring or other yielding support, whereby the connection between the drums is permitted to yield under excessive strain, and an elastic or yielding support for the pedals, so that the machine is enabled to pass over obstructions and uneven surfaces without subjecting the rider to the unpleasant jar and vibration attending the use of ordinary machines. I also provide in the present application improvements in the automatic clutch mechanism and in the connections between the automatic lever and drums.

Figure 6:
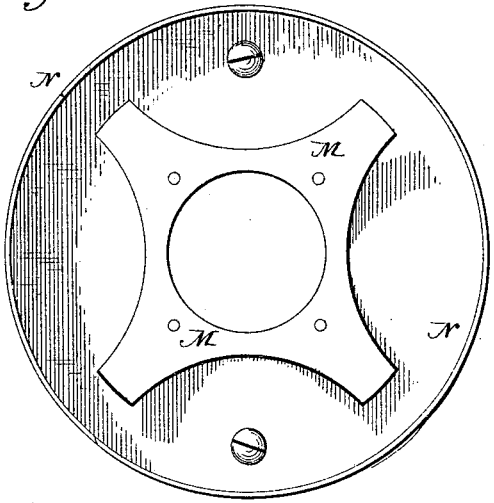
Figure 8:
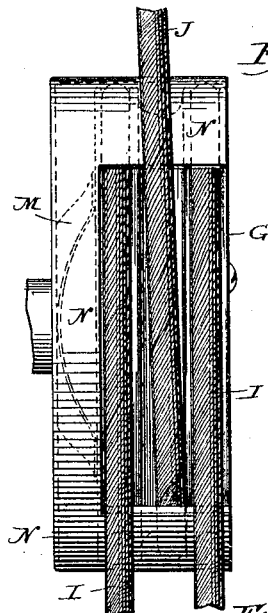
Figure 7:
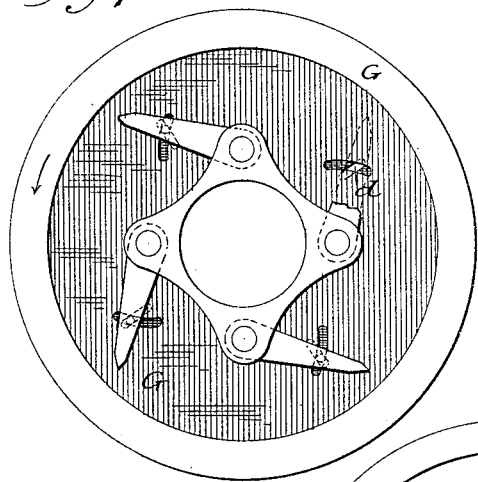
Figure 9:
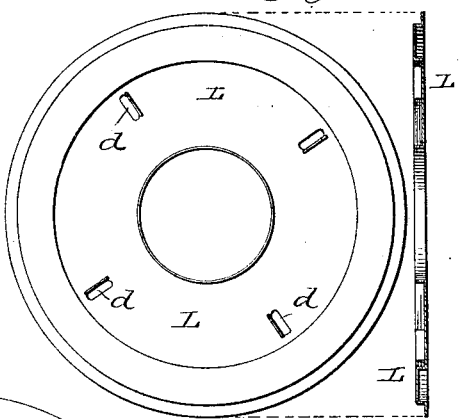
Figure 10:
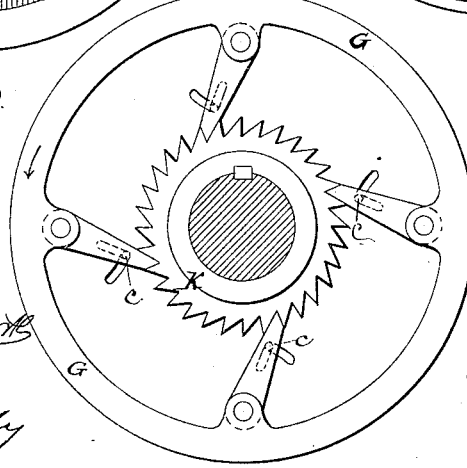
Figure 11:
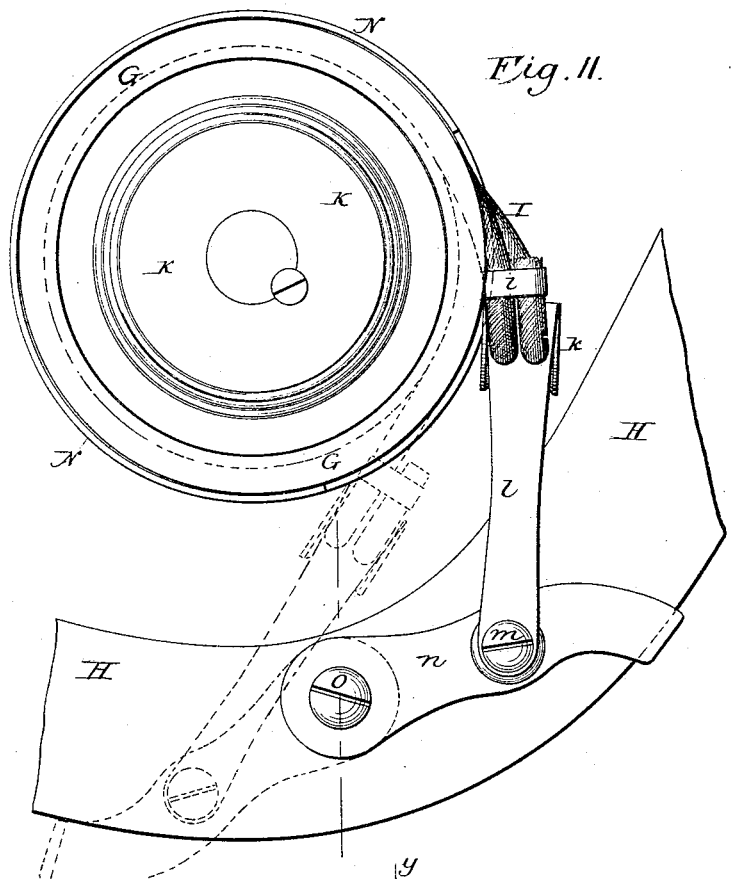
Figure 12:
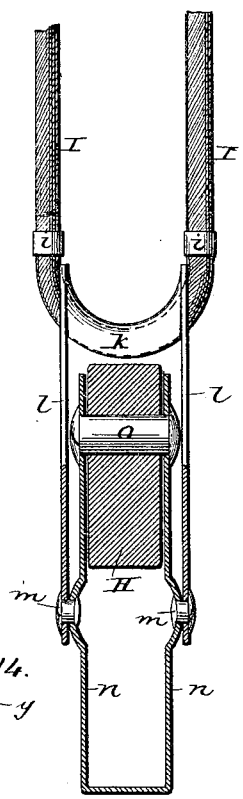
Figure 13:
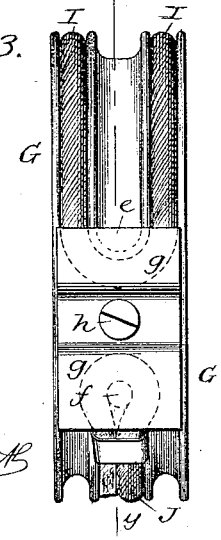
Figure 14:
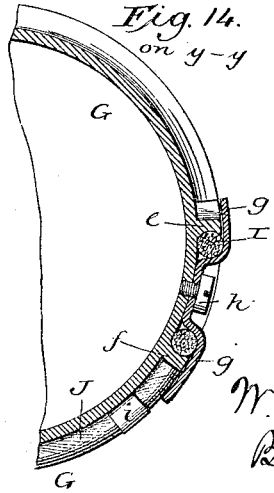

Referring to the accompanying drawings, Figure 1 represents a side elevation of a machine of the well-known "Star" type having my improvements embodied therein. Figs. 2 and 3 are perspective views illustrating modified forms of the yielding support for the pulley. Fig. 4 is a central axial section through the improved clutch mechanism. Fig. 5 is a section of the same through the line *z z*, looking in the direction indicated by the arrow. Fig. 6 is an inside face view of the clutch mechanism, showing more particularly the friction-plate, which acts through intermediate devices to throw the pawls into and out of action. Fig. 7 is an inside face view of the driving-drum, one of the pawls being removed to expose the slots thereunder. Fig. 8 is an edge view showing the driving-drum, its encircling case or shield, and the manner in which the cords are applied. Fig. 9 is a face view of the friction disk or plate. Fig. 10 is a modification of the clutch mechanism. Fig. 11 is a side elevation showing the adjustable connection between the foot-lever and the drum. Fig. 12 is a sectional elevation of the same on the line *x x*. Fig. 13 is an edge view showing the manner in which the double cords are connected to the drum. Fig. 14 is a vertical section through the same on the line *y y*.

In the drawings, A represents the main driving-wheel, arranged to revolve in the rear end of the main frame B, which latter carries at its forward end a swiveling bar or shaft, C, the lower end of which is forked to receive the front steering-wheel, D. The main frame is provided at its top with a longitudinal spring-bar, E, on which the rider's seat or saddle F is mounted, substantially above the axis of the driving-wheel. At each end the axle is provided with an independently-revolving drum, G, connected with the wheel by a suitable clutch mechanism, so that when the drum is turned in a forward direction it will impart motion to the wheel. To each side of the frame there is pivoted a foot-lever, H, from which double cords or straps I are extended upward around the front side of the adjacent drum, to which they are secured, so that the depression of the lever will turn the drum in a forward direction. A flexible cord or strap, J, is passed over a pulley, K', at the top of the main frame and extended downward at its two ends around the forward sides of the respective drums to which the ends are secured, so that the depression of either foot-lever and the forward rotation of its drum will cause the drum and lever at the opposite side of the machine to move in a reverse direction.

The foregoing parts have essentially the same construction and mode of action as those in my previous application, already referred to. Instead of supporting the pulley K' rigidly in position, as in the previous machine, I now mount the same upon the middle of the seat-spring E, as shown in Fig. 1, or upon any other suitable yielding support by which it will be permitted to sink whenever a severe strain is applied to the cord. It will be seen that the cord sustained by this yielding pulley gives in turn a yielding or elastic support to the two levers, so that the shocks and vibrations which arise from the passage of the wheels over uneven surfaces is not communicated through the pedals to the rider, as in ordinary machines. When the machine is used in coasting, or in riding over large obstructions, this is an important feature, inasmuch as the entire weight of the rider may be placed upon the pedals and carried by the spring.

Instead of mounting the pulley directly on the seat spring, it may be mounted, as shown in Fig. 2, on a plate, L′, which latter is sustained from the seat spring or bar by intermediate springs, M′, of rubber or metal; or the pulley may be mounted on one end of an elastic arm, N′, the opposite end of which is secured to the seat bar or spring, or to any other appropriate part of the machine. It is to be distinctly understood that the essence of my invention in this regard consists in providing a yielding or spring support for the pulley, which sustains the connecting-cord J, and that the details of construction may be modified, as desired, provided the pulley is permitted to sink under the strain of the cord. While I prefer to locate the pulley at the top of the frame, as shown, it is to be understood that it may be located in any other convenient position.

In machines in which the usual spring is employed within the drum to secure its backward rotation, the connecting-cord J may be extended directly from one pedal to the other, as indicated by the dotted lines, instead of being connected to the pedal through the medium of the drum.

Referring now to the clutch mechanism, which is constructed with special reference to its silent and positive action, attention is directed to Figs. 4, 5, 6, and 9. K represents a wheel secured rigidly to the axle and provided on the inner side with a peripheral flange, the inner surface of which is constructed with ratchet-teeth $b$ therein, as shown in Fig. 5. G represents a drum turning loosely on the axle, its center provided with or secured to a ratchet-wheel, K, in which the pawls engage, and its periphery being provided with a flange, which loosely encircles the wheel K, and which is grooved externally to receive the pedal and the connecting-cords before alluded to. Each of the pawls is provided with a laterally-projecting pin, $c$, which extends through a slot in the inner side of the drum and enters a slot, $d$, in an external friction-plate, L, (plainly represented in Fig. 9,) which lies against the inner face of the drum, as shown in Fig. 4. The spring-plate M, having a series of radial arms, which bear upon the plate L, is secured, as shown in Fig. 4, to the arm or to any other immovable part of the machine. The slots $d$ stand in a radial or approximately radial position. The spring M acts to resist and retard the rotation of the plate L. When, therefore, the drum is turned in a forward direction, the pins of the pawls are caused to ride outward in the slots $d$, so as to force the pawls into engagement with the teeth of the wheel K. As soon as this engagement is effected, the several parts lock firmly together, and the friction-plate revolves with the drum. When the motion of the drum is reversed, the plate L remains stationary under the influence of the spring M until the pins on the pawls ride to the inner ends of the slots out of engagement with the ratchet-teeth, after which the parts revolve together.

From the foregoing it will be perceived that the slotted friction-plate by its resistance serves to throw the pawls positively into and out of action, and to hold them out of action after a reverse motion of the drum, so that the main wheel may be turned freely in a backward direction.

Instead of attaching the pawls to the hub of the drum, they may be secured, as shown in Fig. 10, to the rim of the pulley K, and arranged to engage a ratchet-wheel secured to the center of the drum. This arrangement is merely the reverse of that represented in Fig. 5, and will be employed in connection with a frictional plate and spring arranged to operate in connection with the pawls in the same manner as in the first form of the device.

In order to protect the operating-cords I and J, and to prevent them from riding out of the grooves in the drum, I surround the latter by a stationary sheet-metal shell or shield, N, secured to the side of the frame or to some other stationary part of the machine. At its forward side this shield is formed with an opening through which the cords pass, as plainly shown in Fig. 8.

I prefer to employ a double connection between each drum and its operating-lever, as in my previous application, by doubling a cord or wire upon itself and attaching the two extremities of the pedal. I now secure the upper or middle portion of the pedal-cord and the lower end of the connecting-cord J by hooking them over and around fixed studs or projections $e$ and $f$ on the drum, as shown in Fig. 13, and confining them in place thereon by a covering-plate, $g$, secured to the drum by a screw, $h$. The plate thus applied maintains the connection of both cords, and at the same time admits of their being quickly disconnected, if necessary. The lower ends of the pedal-cord J are lapped upon or past each other, as shown in Figs. 11 and 12, and secured by metal clasps $i$ compressed thereon. They are passed beneath the stirrup $k$, secured to the upper ends of two arms, $l$, which are in turn connected at their lower ends by pivots $m$ to a U-shaped stirrup, $n$, which straddles the foot lever or pedal from the under side, being secured thereto by a pivot, $o$. This stirrup $n$ may be turned upon its pivot so as to bear against the treadle either in front or in rear of the pivot, as indicated by dotted lines in Fig. 11, in order to change the distance between the pivot of the lever and the point at which the cord or strap is connected thereto, that the rider may obtain increased leverage when necessary for hill-climbing or other purposes, as in existing machines. The weight of the rider will hold the stirrup $n$ in either of the two positions in which it may be placed. In order that the pivots $m$ may pass the sides of the lever, the arms of the stirrup are bowed outward, as shown in Fig 12, so that the rotating inner ends of the pivots $m$ may lie flush with the inner face of the stirrup.

Having thus described my invention, what I claim is—

1. In a bicycle having a propelling-wheel and propelling-levers connected therewith by clutch mechanism, an intermediate cord, J, and a yielding or spring-supported pulley to sustain said cord, substantially as described.

2. The combination of a propelling-wheel, two clutch mechanisms acting to turn the same in a forward direction, foot-levers connected to said clutches by flexible connection from one of said clutch mechanisms to the other, a pulley to sustain said connection, and a spring-support for said pulley.

3. In a bicycle of the type herein described, the combination of the main frame, the main wheel, the two clutch mechanisms on opposite sides of said wheel, the foot-levers connected to said clutch mechanisms, the seat-supporting spring, the pulley mounted upon a yielding portion of said spring, and a flexible connection, J, extended over said pulley to the respective clutch mechanisms.

4. In a vehicle, the combination, with the propelling-wheel and two driving-drums connected with said wheel by automatic clutching devices, of two foot-levers connected with said clutches to turn them in a forward direction, and a yielding connection operating, as described, through the drums or directly upon the levers to effect the elevation of each lever as the other is depressed.

5. The combination of the rotating drum and pulley, connected, as described, by intermediate pawls and ratchet-teeth, the plate L, connected with the pawls by a slot and pin, and the stationary spring M, bearing against the face of said plate, as described.

6. In combination with the driving-drum having projections to engage the straps I and J, the plate $g$, secured by the screw $h$, and acting to confine both cords in position.

7. The driving-drum and foot-lever, the cord I, doubled upon itself and secured together, in combination with means, substantially as described, for connecting the same to the drum and lever, respectively.

8. The combination of the drum, its actuating-lever, the cord doubled upon itself and attached at its ends to the drum, and the stirrup $k$, secured to the lever and provided at its upper end with the bearing-surface seated within the loop or bight of the cord.

9. In combination with the lever and the cord I, the intermediate connection consisting of the stirrup $k$ and the reversible stirrup $n$, pivoted to the lever, as described and shown.

10. In combination with the peripherally-curved drum and the cords applied thereto, the stationary shield or casing inclosing the drum, provided with an opening for the passage of the cord, as described.

In testimony whereof I hereunto set my hand, this 18th day of December, 1885, in the presence of two attesting witnesses.

WILLARD G. RICH.

Witnesses:
C. A. PHILLIPS,
W. F. OSBORN.